United States Patent
Toji

(10) Patent No.: US 8,842,968 B2
(45) Date of Patent: Sep. 23, 2014

(54) REPRODUCTION APPARATUS

(75) Inventor: Shigeru Toji, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/459,384

(22) Filed: Apr. 30, 2012

(65) Prior Publication Data
US 2012/0308201 A1 Dec. 6, 2012

(30) Foreign Application Priority Data

May 31, 2011 (JP) ................................. 2011-121825

(51) Int. Cl.
 H04N 9/80 (2006.01)
 H04N 5/783 (2006.01)
 H04N 5/935 (2006.01)
 G11B 3/64 (2006.01)

(52) U.S. Cl.
 USPC ........... 386/241; 386/214; 386/248; 386/343; 369/85

(58) Field of Classification Search
 USPC ............ 386/241, 214, 343, E9.011, 248, 334; 369/85; 375/E7.024, E7.278
 See application file for complete search history.

(56) References Cited

U.S. PATENT DOCUMENTS

| 6,807,363 B1 * | 10/2004 | Abiko et al. | 386/343 |
| 8,189,987 B2 * | 5/2012 | Choi et al. | 386/200 |
| 2009/0074382 A1 * | 3/2009 | Itoh et al. | 386/95 |
| 2012/0008480 A1 * | 1/2012 | Hattori et al. | 369/85 |

FOREIGN PATENT DOCUMENTS

| JP | 10-162561 A | 6/1998 |
| JP | 2000-101971 A | 4/2004 |
| JP | 2005-142685 | 6/2005 |
| JP | 2005-260556 A | 9/2005 |

OTHER PUBLICATIONS

Japanese Office Action issued on Jul. 1, 2014, in Japanese Patent Application No. 2011-121825.

* cited by examiner

Primary Examiner — Thai Tran
Assistant Examiner — Syed Hasan
(74) Attorney, Agent, or Firm — Morgan, Lewis & Bockius LLP

(57) ABSTRACT

A reproduction apparatus includes a calculating portion that calculates a packet position corresponding to specified reproduction time based on header information contained in an image and sound file when reproduction time is specified by an operating portion, and a reproducing portion that starts reproduction of image and sound from a packet of the calculated packet position.

4 Claims, 5 Drawing Sheets

REPRODUCTION APPARATUS

CROSS-REFERENCE TO RELATED APPLICATIONS

This application is based on Japanese Patent Application No. 2011-121825 filed on May 31, 2011, the contents of which are hereby incorporated by reference.

BACKGROUND OF THE INVENTION

1. Field of the Invention

The present invention relates to a reproduction apparatus that reproduces image and sound files.

2. Description of Related Art

Conventionally, there are developed various reproduction apparatuses capable of reproducing image and sound files (for example, see JP-A-2005-142685). As such a reproduction apparatus, there is one capable of reproducing a Windows (registered trademark) Media Video file (WMV file) as the image and sound file.

The WMV is a video codec developed by Microsoft Corporation, and the WMV file contains image data encoded by WMV and sound data encoded usually by Windows Media Audio (WMA). The image data and the sound data are contained by packet unit. In addition, the WMV file contains index information in addition to real data of image and sound.

The index information contains reproduction time and packet position in association with each other. When a user specifies reproduction time, the index information is referred to so that a packet position corresponding to the specified reproduction time is grasped. Thus, it is possible to reproduce from a user's desired reproduction position by reproducing the grasped packet position.

However, because the index information is not essential, the WMV file may not contain the index information. In this case there is a problem that reproduction from the specified reproduction time cannot be performed.

SUMMARY OF THE INVENTION

It is an object of the present invention to provide a reproduction apparatus capable of reproducing from the user's specified reproduction time even if the index information is not contained in the image and sound file.

A reproduction apparatus according to the present invention includes a calculating portion that calculates a packet position corresponding to specified reproduction time based on header information contained in an image and sound file when reproduction time is specified by an operating portion, and a reproducing portion that starts reproduction of image and sound from a packet of the calculated packet position.

With this structure, even if the index information is not contained in the image and sound file, the packet position corresponding to the specified reproduction time can be calculated based on the header information. Therefore, it is possible to reproduce image and sound from the user's specified reproduction time. Note that, the image and sound mentioned here means at least one of image and sound. In addition, the case where the index information is not contained includes a case where the index information is defined in the standard but is not contained because it is not essential, and a case where the index information is not defined in the standard.

In addition, in the structure described above, it is possible to adopt a structure in which the calculating portion calculates the packet position corresponding to the specified reproduction time based on information of the number of total packets, information of the entire size of the total packets, total reproduction time information, and start position information of data containing packets, which are contained in the header information.

In addition, any one of the above-mentioned structures may further includes a deciding portion that decides whether or not there is a difference between reproduction time of a packet at the calculated packet position corresponding to the specified reproduction time and the specified reproduction time, and an adjusting portion that adjusts the packet position corresponding to the specified reproduction time if there is the difference.

With this structure, even if there is a difference between reproduction time of a packet at the calculated packet position corresponding to the specified reproduction time and the specified reproduction time, the packet position corresponding to the specified reproduction time is adjusted. Therefore, by reproducing from the adjusted packet position, it is possible to reproduce from the specified reproduction time.

In addition, in any one of the structures described above, the image and sound file may be a Windows Media Video (WMV) file.

DETAILED DESCRIPTION OF THE PREFERRED EMBODIMENTS

Hereinafter, an embodiment of the present invention is described with reference to the attached drawings. A schematic structure of a Blu-ray disc reproduction apparatus according to an embodiment of the present invention is illustrated in FIG. 1.

Figure 1:
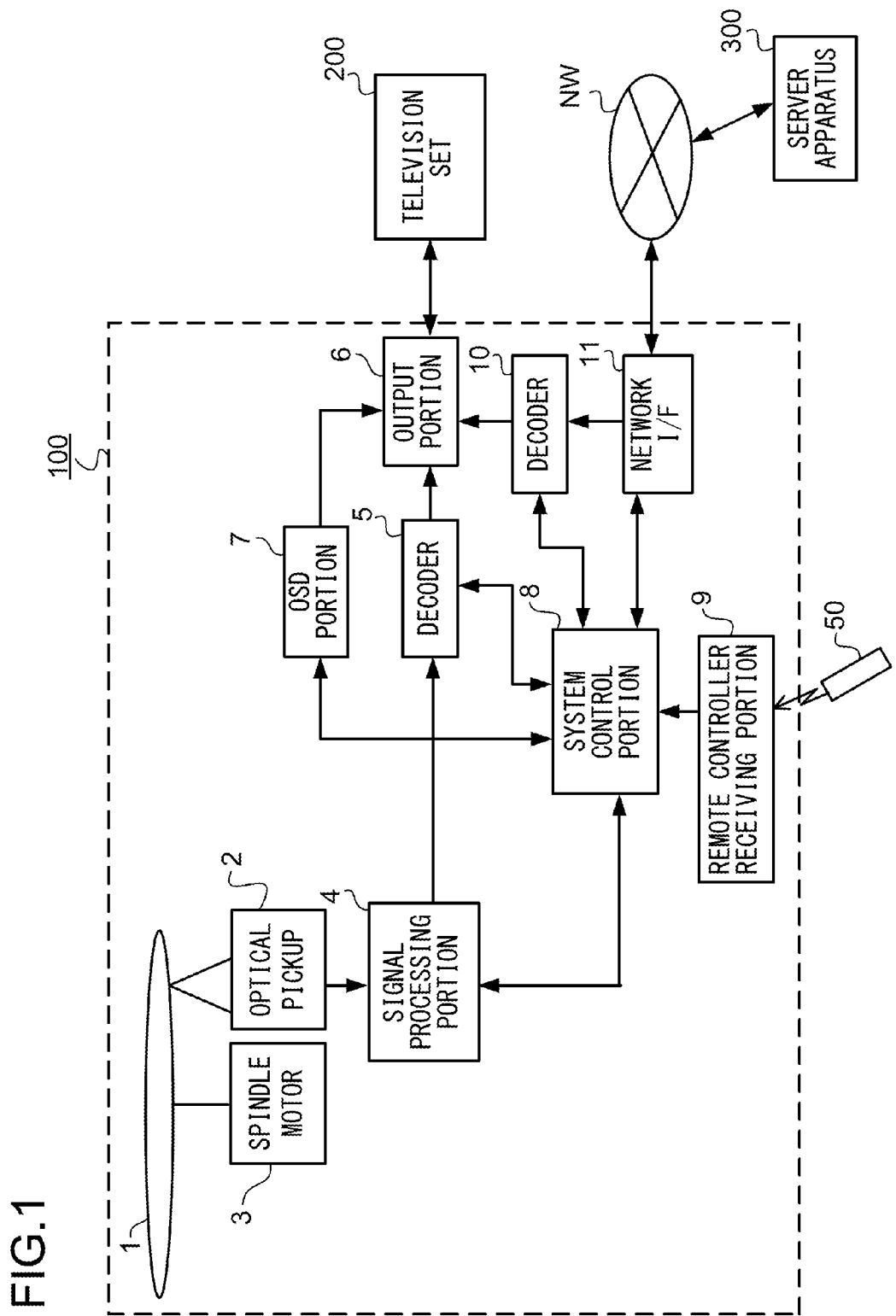
FIG. 1 is a schematic block diagram of a Blu-ray disc reproduction apparatus according to an embodiment of the present invention.

A Blu-ray disc reproduction apparatus 100 illustrated in FIG. 1 includes an optical pickup 2, a spindle motor 3, a signal processing portion 4, a decoder 5, an output portion 6, an on screen display (OSD) portion 7, a system control portion 8, a remote controller receiving portion 9, a decoder 10, and a network interface (I/F) 11. The output portion 6 is connected to an external television set 200.

The spindle motor 3 is a motor that drives rotation of a Blu-ray disc (hereinafter referred to as BD) 1 via a turn table (not shown). The optical pickup 2 includes a laser diode, an objective lens, an objective lens actuator, a photodetector, and the like, which are not shown, so as to project a laser beam to a recording surface of the rotating BD 1 and to output an RF signal based on reflection light from the recording surface. Note that the optical pickup 2 is moved in a radial direction of the BD 1 by a sled motor (not shown). In addition, the optical pickup 2, the spindle motor 3, the turn table, and the sled motor are included in a loader device (not shown), and the loader device includes a loader mechanism (not shown) for mounting and ejecting a disc.

The signal processing portion 4 performs A/D conversion of the RF signal output from the optical pickup 2 so as to generate binary data, performs demodulation and error correction on the binary data so as to output reproduced data to the decoder 5. The reproduced data is decoded by the decoder 5. The image and sound data after the decoding is converted into an image and sound signal having a predetermined format by the output portion 6 and is output to the television set 200. The television set 200 displays the image and produces the sound based on the received image and sound signal.

The OSD portion 7 generates an OSD signal by instruction from the system control portion 8, transmits the OSD signal to the television set 200 via the output portion 6, and hence the television set 200 displays an OSD screen.

The network I/F 11 performs communication with a server apparatus 300 via a network NW. The network NW is, for example, a network conforming to a Digital Living Network Alliance (DLNA) standard. The server apparatus 300 stores the WMV file. In response to a request from the network I/F 11, the server apparatus 300 sequentially sends packets contained in the WMV file to the network I/F 11. The decoder 10 decodes image and sound data contained in the packet obtained by the network I/F 11 and outputs the decoded image and sound data to the output portion 6. Thus, the television set 200 displays the image and produces the sound of the WMV file.

The system control portion 8 is constituted of a microcomputer, for example, and controls individual portions of the Blu-ray disc reproduction apparatus 100. The remote controller receiving portion 9 receives a remote control signal corresponding to an operation from a remote controller device 50, converts the received remote control signal into a remote control code, and outputs the remote control code to the system control portion 8.

Figure 2:
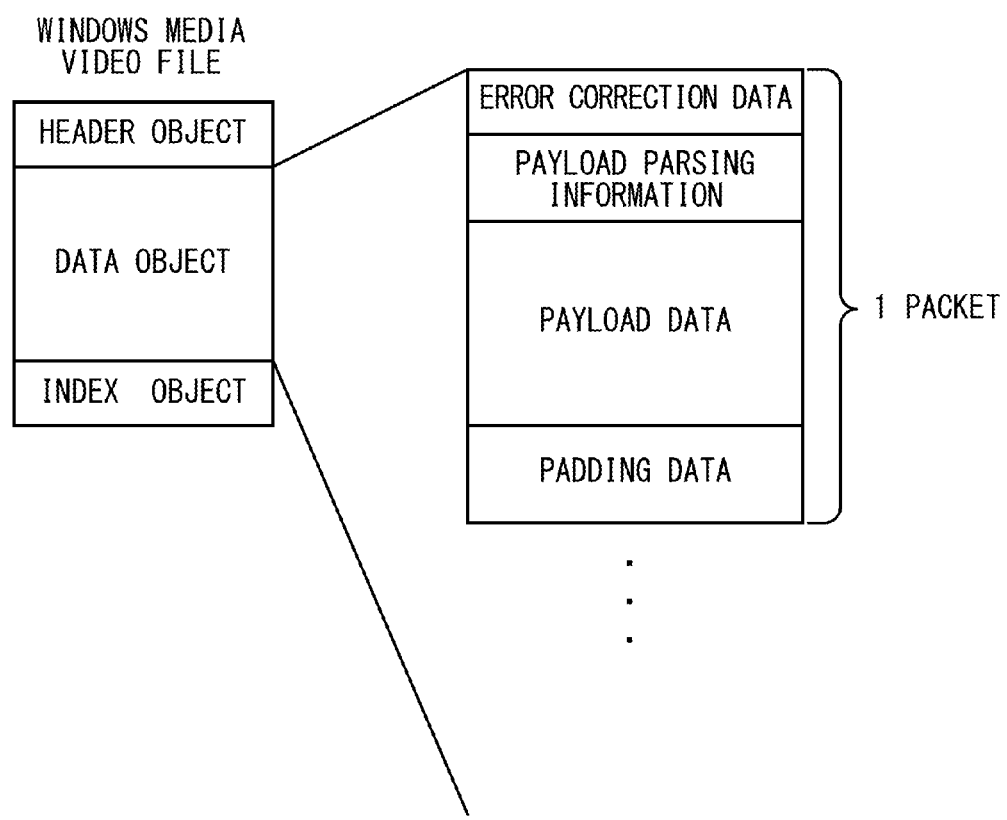
FIG. 2 is a diagram illustrating a structure of the WMV file.

Here, a structure of the WMV file is described with respect to FIG. 2. As illustrated in FIG. 2, the WMV file includes Header Object, Data Object, and Index Object. The Header Object is header information containing meta data such as a file size, the number of packets, total reproduction time, and the like. Data Object includes many packets.

One packet includes Error Correction Data, Payload Parsing Information, Payload Data, and Padding Data. The Error Correction Data is data for performing error correction. The Payload Parsing Information contains meta data such as reproduction time of the packet, a packet size, and the like. The Payload Data contains real data as the image and sound data. The image data is encoded by WMV, and the sound data is usually encoded by WMA (or may be encoded by MPEG Audio Layer-3 (MP3)). The Padding Data is dummy data for adjusting the packet size.

In addition, the Index Object is the above-mentioned index information and is not essential information. In this embodiment, even if this Index Object is not contained, reproduction from user specified reproduction time can be performed.

Next, the reproducing process of the WMV file from user specified reproduction time according to this embodiment is described with reference to the flowchart illustrated in FIG. 3.

Figure 3:
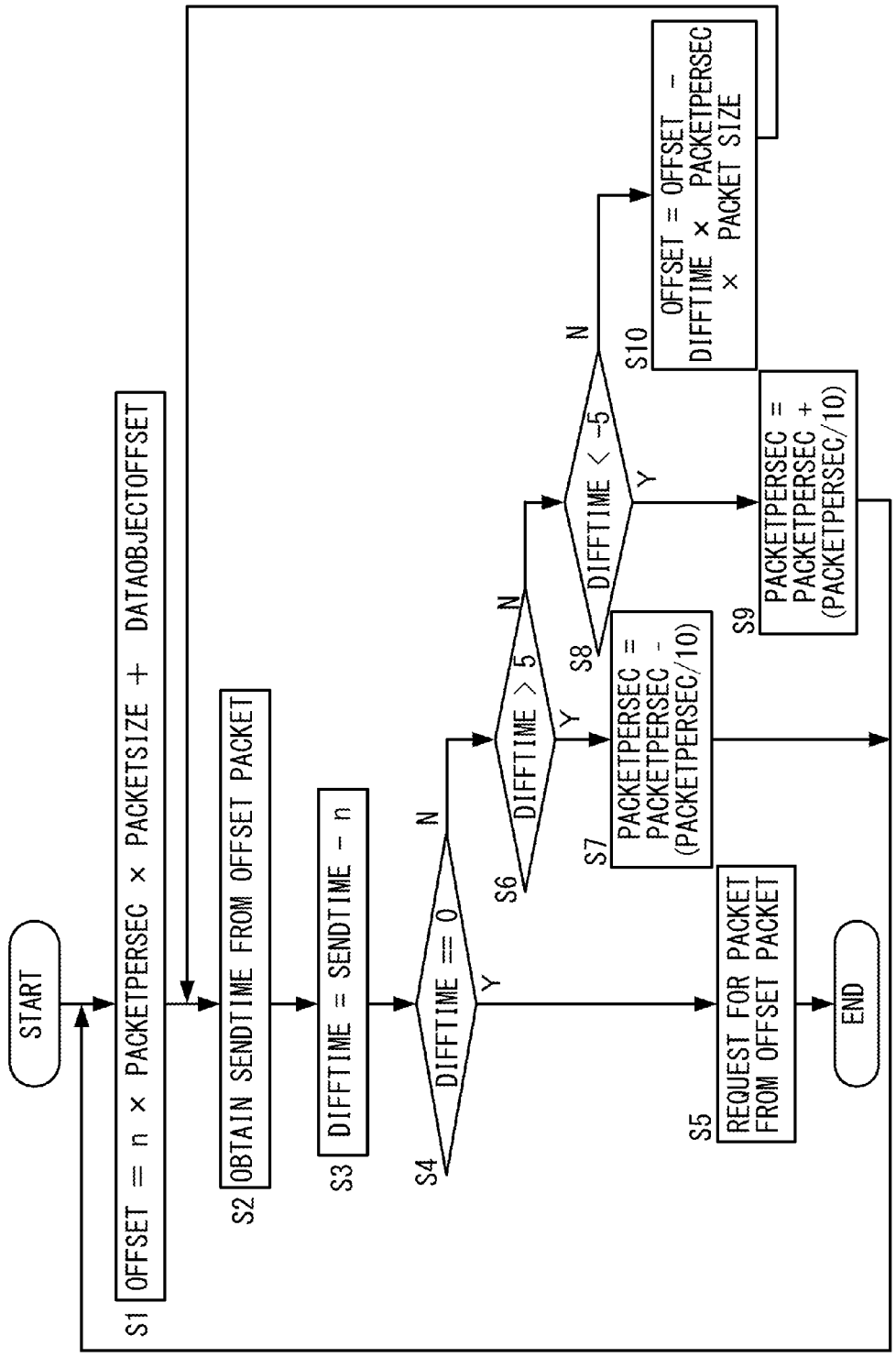
FIG. 3 is a flowchart concerning a file reproducing process according to an embodiment of the present invention.

When the user performs reproduction time specifying operation with the remote controller device 50, the process of flowchart of FIG. 3 is started. As the specifying method of the reproduction time, the user may directly specify the reproduction time on the screen by setting values (time, minute, and the like), for example. In addition, when the user operates a fast forward key or a fast rewind key, for example, a predetermined time after or before the current reproduction time (for example, ten minutes after or before) may be set as the specified reproduction time so that the flowchart of FIG. 3 is performed repeatedly.

When the process of the flowchart of FIG. 3 is started, first in Step S1, the system control portion 8 requests the server apparatus 300 for data via the network I/F 11 and obtains Header Object of the WMV file. Then, the system control portion 8 extracts the number of packets contained in Data Object, the entire size of Data Object, the total reproduction time, and a start position of the Data Object from Header Object.

Then, the system control portion 8 calculates PacketPerSec that is the number of packets per second based on the data extracted from the Header Object using the equation (1). (Note that if the unit of the total reproduction time contained in Header Object is not second, it is converted into second).

$$\text{PacketPerSec} = (\text{the number of packets contained in Data Object})/(\text{total reproduction time(seconds)}) \quad (1)$$

Next, the system control portion 8 calculates a data start position corresponding to the specified reproduction time (offset illustrated in FIG. 3) based on the data extracted from Header Object using the equation (2). Note that, the packet size in the equation (2) is calculated by dividing the entire size of Data Object by the number of packets contained in Data Object.

$$\text{data start position} = (\text{specified reproduction time(seconds)}) \times \text{PacketPerSec} \times (\text{packet size}) + (\text{start position of Data Object}) \quad (2)$$

When the data start position is calculated in Step S1, the process goes to Step S2, in which the system control portion 8 requests the server apparatus 300 for data via the network I/F 11 and obtains a packet of the calculated data start position from the server apparatus 300. Then, the system control portion 8 extracts Send Time contained in Payload Parsing Information (reproduction time of the packet) from the obtained packet.

Then, the process goes to Step S3. The system control portion 8 calculates diffTime that is a difference between the extracted Send Time and the specified reproduction time, and decides in Step S4 whether or not diffTime is equal to zero.

If diffTime is equal to zero (Y in Step S4), the process goes to Step S5, in which the system control portion 8 requests the server apparatus 300 for packets from the packet of the data start position via the network I/F 11. Then, the server apparatus 300 sends the packets sequentially from the packet of the data start position to the network I/F 11. The decoder 10 decodes the image and sound data contained in the sent packets and outputs the decoded image and sound data to the output portion 6. Thus, the image and sound of the WMV file from the specified reproduction time is reproduced by the television set 200.

If diffTime is not equal to zero in Step S4 (N in Step S4), the process goes to Step S6, in which the system control portion 8 decides whether or not diffTime is larger than 5 seconds. If diffTime is larger than 5 seconds (Y in Step S6), the process goes to Step S7, in which the system control portion 8 sets 90% of the current PacketPerSec as a new PacketPerSec. Then, the process goes back to Step S1, in which the data start position is recalculated based on the new PacketPerSec.

In addition, if diffTime is 5 seconds or smaller in Step S6 (N in Step S6), the process goes to Step S8, in which the system control portion 8 decides whether or not diffTime is smaller than −5 seconds. If diffTime is smaller than −5 seconds (Y in Step S8), the process goes to Step S9, in which the system control portion 8 sets 110% of the current PacketPer- Sec as a new PacketPerSec. Then, the process goes back to Step S1, in which the data start position is recalculated based on the new PacketPerSec.

If diffTime is −5 seconds or larger in Step S8 (N in Step S8), the process goes to Step S10. In Step S10, the system control portion 8 calculates a new data start position (offset) from the equation (3) based on the current data start position (offset), diffTime, PacketPerSec, and the packet size.

$$\text{offset} = \text{offset} - \text{diffTime} \times \text{PacketPerSec} \times \text{packet size} \quad (3)$$

After Step S10, the process goes back to Step S2, and Send Time is extracted from a packet of the new data start position.

According to the reproducing process of this embodiment described above, even if the index information is not contained in the WMV file, the data start position corresponding to the specified reproduction time is calculated based on the header information so that the image and sound can be reproduced from the user specified reproduction time. In addition, even if the reproduction time of the packet at the calculated data start position is shifted from the specified reproduction time, reproduction from the user specified reproduction time can be performed by adjusting the data start position (offset).

Figure 5:
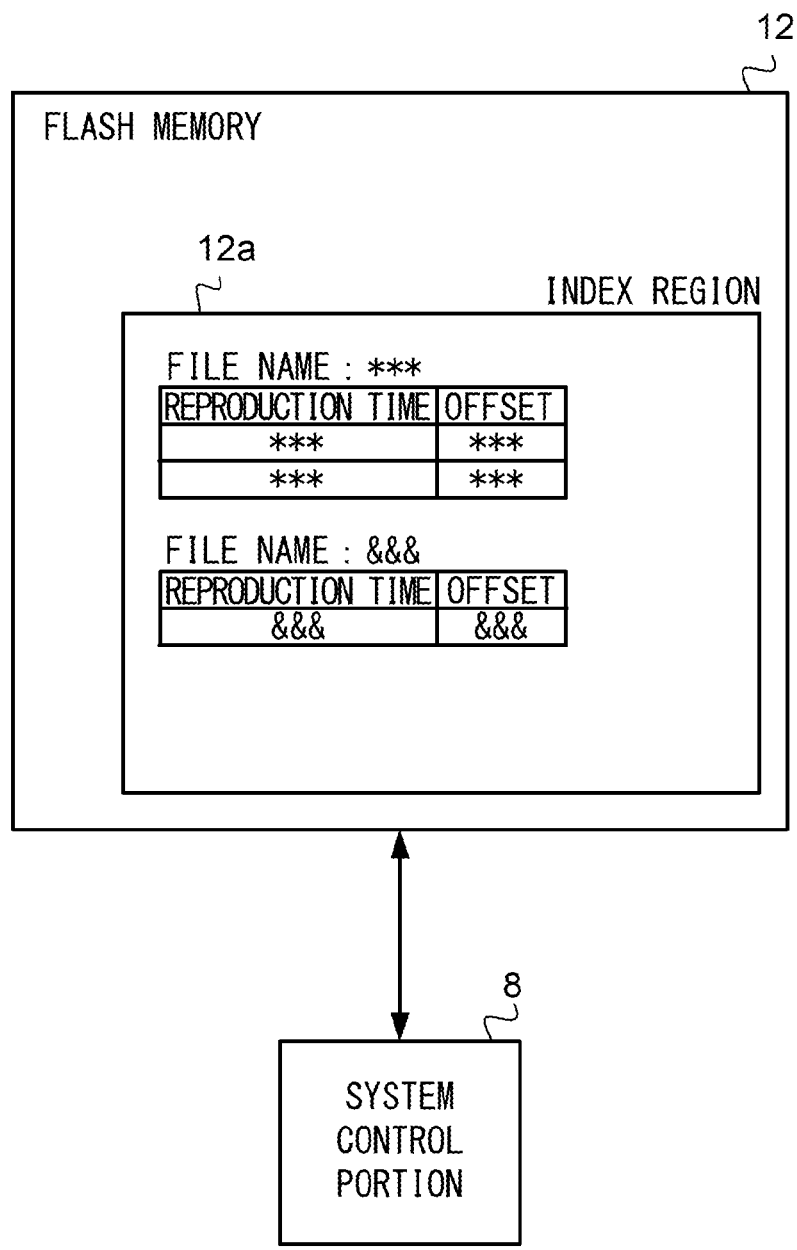
FIG. 5 is a diagram illustrating a storage example in an index region of a flash memory according to another embodiment of the present invention.

Next, a variation example of this embodiment is described. In this variation example, a flash memory 12 is disposed in the Blu-ray disc reproduction apparatus 100 (FIG. 5). The flash memory 12 is a nonvolatile memory that maintains the stored information even if power supply is cut off. A predetermined index region 12a is disposed in the flash memory 12 (FIG. 5). It is possible to adopt a structure in which a size of the index region 12a can be changed by the user.

Figure 4:
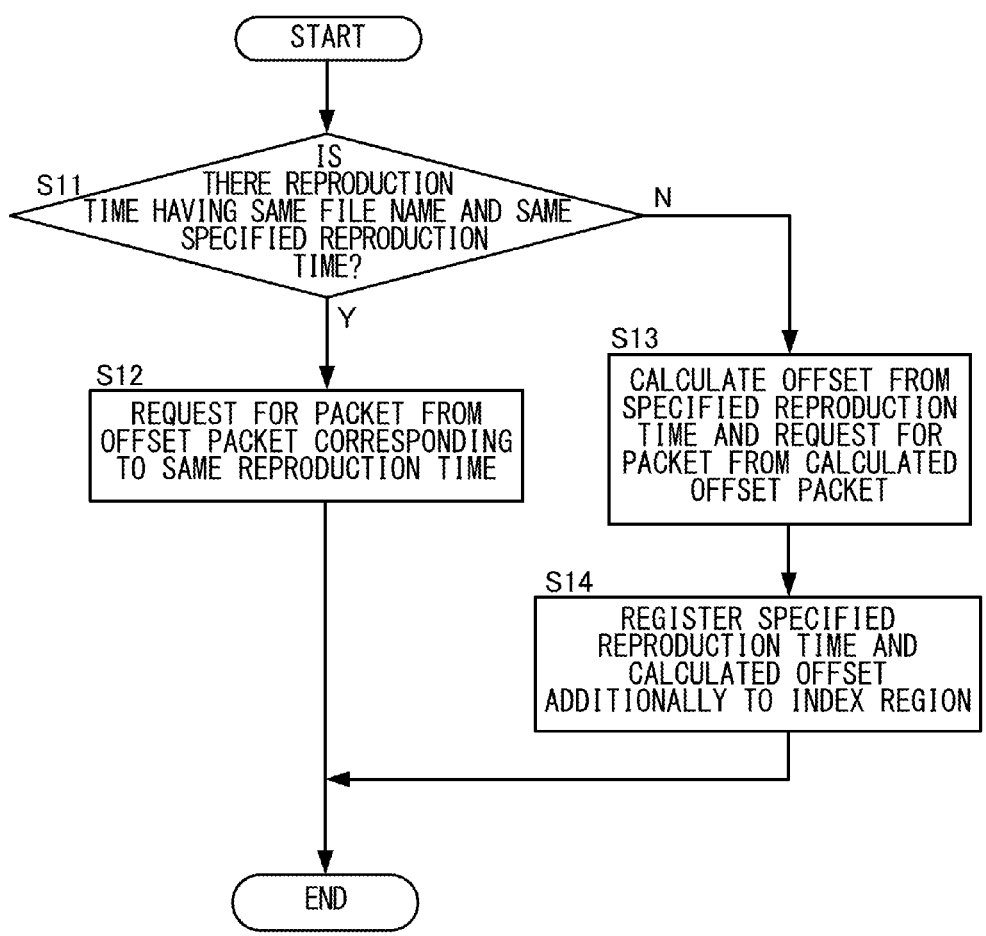
FIG. 4 is a flowchart concerning a file reproducing process according to another embodiment of the present invention.

A flowchart of the reproducing process from the specified reproduction time according to this variation example is illustrated in FIG. 4. When the user performs the reproduction time specifying operation with the remote controller device 50, the process of flowchart of FIG. 4 is started.

When the process of flowchart of FIG. 4 is started, first in Step S11, the system control portion 8 refers to the index region 12a of the flash memory 12 and decides whether or not there is stored the same reproduction time as the specified reproduction time of the same file name as the current WMV file to be reproduced. If there is no such storage (N in Step S11), the process goes to Step S13 in which the system control portion 8 performs the process of FIG. 3 described above. In other words, the system control portion 8 calculates the data start position (offset) from the specified reproduction time and requests for packets from the packet of the calculated data start position. Thus, the reproduction from the specified reproduction time is started.

After Step S13, in Step S14, the system control portion 8 associates the specified reproduction time with the calculated data start position and associates the same with the current file name to be reproduced, which is stored in the index region 12a (FIG. 5). Note that, if the current file name to be reproduced is not yet stored in the index information, the current file name to be reproduced is newly registered, while the specified reproduction time and the calculated data start position are stored.

On the other hand, in Step S11, if the same reproduction time as the specified reproduction time of the same file name as the current file name to be reproduced is stored in the index region 12a (Y in Step S11), the process goes to Step S12. In Step S12, the system control portion 8 requests for packets from the packet of the data start position corresponding to the identical reproduction time. Thus, the reproduction from the specified reproduction time is started.

According to this variation example described above, the specified reproduction time and the data start position of a certain file name are once registered in the index region 12a, it is possible from the next time to start in short time the reproduction from the specified reproduction time of the same file name and the same specified reproduction time.

Note that it is possible to adopt a structure in which the latest reproduction time and the number of reproduction times are associated with the file name and stored in the index region 12a. If stored data amount in the index region 12a exceeds a threshold value, data of the file name having oldest reproduction time or the file name having the smallest number of reproduction times may be deleted. In addition, a HDD or the like may be used instead of the flash memory 12.

Although the embodiment of the present invention is described above, the embodiment can be variously modified within the scope of the spirit of the present invention.

For instance, in the embodiment described above, the WMV file stored in the external server apparatus 300 is reproduced, but it is possible to adopt a structure in which a WMV file stored in the BD 1 is reproduced.

In addition, the present invention may be applied to any image and sound file other than the WMV file, and further may be applied to a file containing only images or sound.

What is claimed is:

1. A reproduction apparatus comprising:
   a packet number calculating portion that calculates a number of packets per unit time based on header information contained in an image and sound file;
   a reproduction start packet identifying portion that identifies, based on a number of packets per unit time, a reproduction start packet from which to start reproduction of image and sound; and
   a reproducing portion that starts reproduction of image and sound from the identified reproduction start packet,
   wherein the reproduction start packet identifying portion includes:
      a specified reproduction packet identifying portion that identifies, based on a number of packets per unit time, a specified reproduction packet corresponding to a specified reproduction time specified by a user;
      an extracting portion that extracts a reproduction time contained in from the specified reproduction packet;
      a deciding portion that decides whether or not the extracted reproduction time corresponds with the specified reproduction time specified by the user;
      a setting portion that, when the deciding portion decides that the extracted reproduction time corresponds with the specified reproduction time, sets the specified reproduction packet as the reproduction start packet; and
      a packet number correcting portion that, when the deciding portion decides that the extracted reproduction time does not coincide with the specified reproduction time, corrects the number of packets per unit time,
   wherein, when a difference between the extracted reproduction time and the specified reproduction time is larger than a first threshold value N, the packet number correcting portion decreases the number of packets per unit time.

2. The reproduction apparatus according to claim 1, wherein, when the difference between the extracted reproduction time and the specified reproduction time is larger than 5 seconds, the packet number correcting portion makes the number of packets per unit time equal to 0.9 times a current value thereof.

3. The reproduction apparatus according to claim 1, wherein, when the difference between the extracted reproduction time and the specified reproduction time is smaller than a second threshold value M (where M=−N), the packet number correcting portion increases the number of packets per unit time.

4. The reproduction apparatus according to claim 3, wherein, when the difference between the extracted reproduction time and the specified reproduction time is smaller than −5 seconds, the packet number correcting portion makes the number of packets per unit time equal to 1.1 times the current value thereof.

* * * * *